United States Patent [19]
Cook et al.

[11] Patent Number: 5,302,403
[45] Date of Patent: Apr. 12, 1994

[54] NOVELTY-CONTAINING HANDLE FOR CONFECTIONERY PRODUCT AND METHOD

[75] Inventors: Kathleen Cook, Rising Fawn, Ga.; Fred Schalmo, Birchwood, Tenn.

[73] Assignee: Novelty Concepts, Inc., Atlanta, Ga.

[21] Appl. No.: 20,691

[22] Filed: Feb. 22, 1993

[51] Int. Cl.[5] .......................... A23G 9/00; A23G 9/26
[52] U.S. Cl. ................... 426/134; 426/104; 426/421
[58] Field of Search ............... 426/134, 91, 104, 101, 426/95, 132, 421

[56] References Cited

U.S. PATENT DOCUMENTS

| D. 232,330 | 8/1974 | Cappadona | 426/134 |
|---|---|---|---|
| 294,575 | 3/1884 | Britton | 426/104 |
| 1,623,926 | 4/1927 | Kohler | 426/134 |
| 2,030,126 | 2/1936 | Vogt | 426/132 |
| 2,156,482 | 5/1939 | Robb | 426/134 |
| 2,417,480 | 3/1947 | Friedman | 426/134 |
| 2,469,589 | 5/1949 | Barricihi | 426/134 |
| 2,617,324 | 11/1952 | Brody | 426/134 |
| 2,821,481 | 1/1958 | Moslo | 426/134 |
| 2,834,685 | 5/1958 | Ferguson . | |
| 2,855,312 | 10/1958 | Kielsmeier | 426/134 |
| 2,929,721 | 3/1960 | Mitzenmacher | 426/134 |
| 3,085,883 | 4/1963 | Collier | 426/134 |
| 3,165,252 | 1/1965 | Carter et al. . | |
| 3,366,077 | 1/1968 | Gardner | 426/104 |
| 3,615,596 | 10/1971 | Petti et al. . | |
| 3,748,778 | 7/1973 | Ellies | 426/134 |
| 3,968,262 | 7/1976 | Hodska | 426/134 |

FOREIGN PATENT DOCUMENTS

| 2324344 | 12/1974 | Fed. Rep. of Germany | 426/132 |
|---|---|---|---|
| 1047276 | 12/1951 | France | 426/134 |
| 2055469 | 5/1971 | France | 426/134 |
| 2397793 | 7/1977 | France | 426/134 |
| 416970 | 9/1934 | United Kingdom | 426/132 |
| 1215261 | 12/1970 | United Kingdom | 426/134 |

Primary Examiner—Steven Weinstein

[57] ABSTRACT

A handle for a confectionery product that envelopes a housing detachably engaged to a support. The housing receives a novelty item. After the confectionery product is eaten the novelty item is released by breaking the support from the housing.

6 Claims, 1 Drawing Sheet

NOVELTY-CONTAINING HANDLE FOR CONFECTIONERY PRODUCT AND METHOD

TECHNICAL FIELD

The present invention relates to a handle for a confectionery product. More particularly, the present invention relates to a handle that releasibly encloses a novelty item in a confectionery product.

BACKGROUND OF THE INVENTION

Confectionery products for eating take many varied forms. Candies often are picked up by hand for consumption. Other confectionery products such as frozen ice cream, fruit-flavored frozen liquids, and hard candy suckers are typically attached to a handle. The confectionery product envelopes an upper portion of the handle. A person eating the confectionery product holds a lower portion of the handle to orient the product during consumption. The handle thereafter is discarded. Often these handles are made of wood or food-grade plastic.

As a further inducement to purchase and consume confectionery items, handles have been constructed with ornamental features and characters. The ornamental character typically is molded integral with the handle. The confectionery product then envelopes the character. The ornamental features and characters are revealed by consuming the confectionery product. After the confectionery product was completely consumed, the ornamental character could be used for play. Other handles have been made of a hollow tube having slotted openings. Following consumption of the confectionery product, the handle could be used as a wind instrument, such as a whistle and the like, for play.

While providing an additional incentive to purchase a confectionery product, the ornamental characters attached to the handles had drawbacks. The handle restricted the play use of the ornamental character. The character would be carried by the handle for play. Separating the ornamental character from the handle however, would leave a rough and potentially sharp projection which may prevent the ornamental character from sitting evenly, or may cause injury to a person using the separated character for play.

To further encourage purchase of confectionery products, the novelty item also takes the form of contest entry blank or mail-in redemption coupons. Typically these blanks and coupons are printed as part of the wrapper. Such wrappers however, may become sticky from the confectionery product or torn. This makes it difficult to use the entry form or the coupon.

Accordingly, there is a need in the art for an improved holder for confectionery products which contains a novelty item as a premium.

SUMMARY OF THE PRESENT INVENTION

The present invention overcomes the problems of the prior art by providing a handle for a confectionery product, which releasibly encloses a novelty item. After the confectionery product is eaten, the novelty item is released from the handle.

More particularly described, the handle of the present invention includes a support which matingly engages a housing at a first end. The housing encloses a novelty item, and the housing is thereafter enveloped by the confectionery product. Upon consumption of the confectionery product, the housing is separated from the support to release the novelty item.

More particularly described, the handle for the confectionery product includes a cylindrical support having an annular flange at a first end. The support matingly engages a housing that encloses a novelty item. An open end of the housing includes an annular groove. The annular groove matingly receives the annular flange to secure the support and the housing together. The confectionery product envelopes the housing. A person consumes the confectionery product to uncover the housing. The housing is then detached from the support by removing the annular flange from the groove. The housing thereby opens to release the novelty item.

The present invention further provides a method of releasibly enclosing a novelty item in a confectionery product. More particularly described, the method comprises inserting a novelty item into a housing having an open end. A support attaches to the open end of the housing to close the open end of the housing and seal the novelty item in the housing. The housing then receives a confectionery product. Upon consumption of the confectionery product, the novelty item is released by detaching the support from the housing.

Accordingly, it is an object of the present invention to improve handles for confectionery products.

It is another object of the present invention to improve the packaging of premiums with confectionery products.

Still other objects, features and advantages will become apparent upon a reading of the following detailed description in conjunction with the drawings and the appended claims.

DETAILED DESCRIPTION OF THE PREFERRED EMBODIMENT

Figure 1:
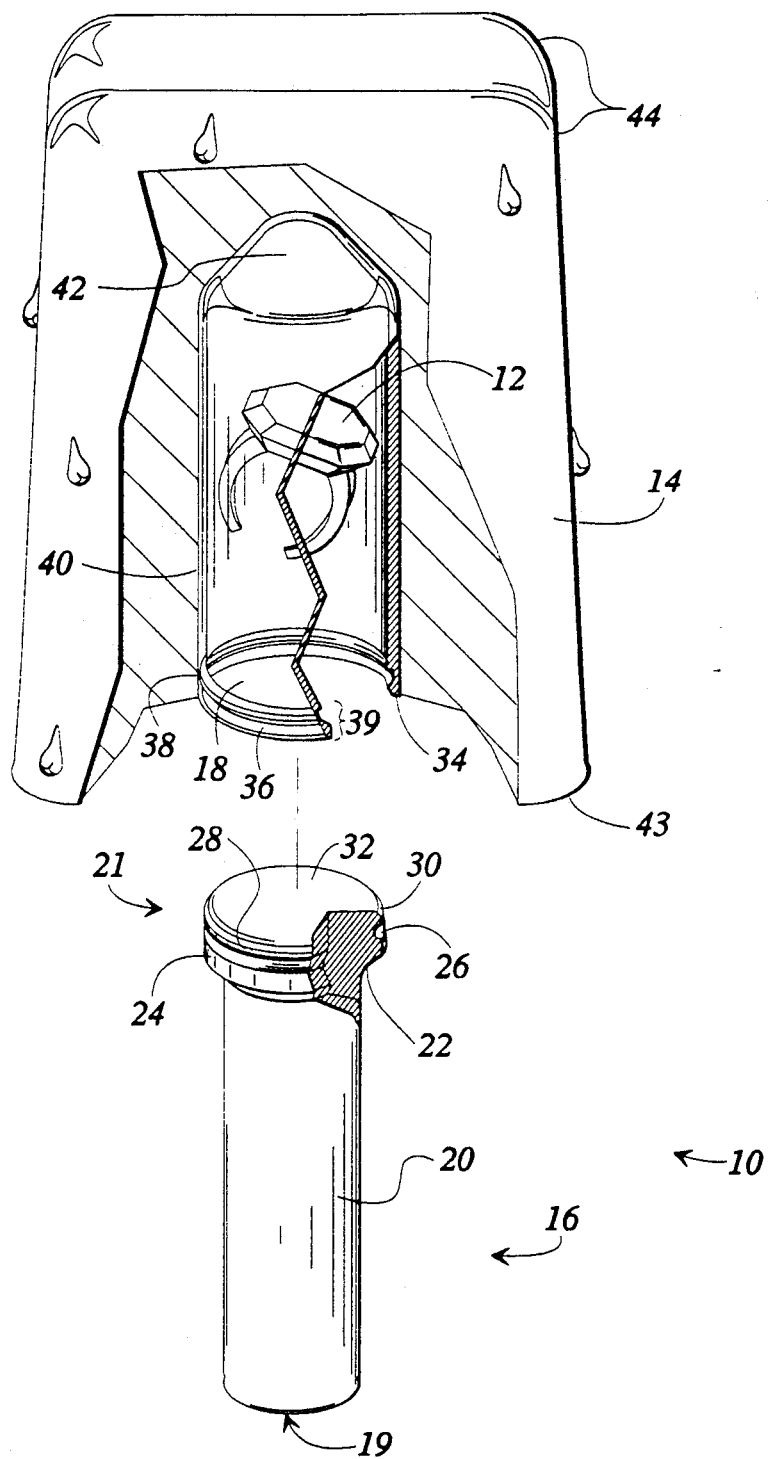
FIG. 1 is a cut-away side view of a preferred embodiment of a handle of the present invention for a confectionery product.

Referring now in more detail to the drawing, FIG. 1 illustrates a partially cut-away side view of a handle 10 constructed in accordance with the present invention for holding a novelty item 12 in a confectionery product 14. The handle 10 includes a support 16 and a housing 18. The support 16 in the illustrated embodiment is cylindrical for convenience in manufacturing. A first end 19 is open and a second end 21 is closed, as discussed below. The support 16 comprises an elongated body 20 of a first diameter. Near the second end 21, the support 16 defines an annular taper 22 outwardly to a second diameter. The taper forms a boss 24 having the second diameter. The boss 24 includes an annular groove 26. The groove 26 defines a flange 28 at the upper end 21 of the support 16. The flange 28 tapers inwardly to define a bearing surface 30. The upper end 21 of the cylinder is closed with a top surface 32.

A first end 34 of the housing 18 is open for matingly engaging the flange 28 of the support 16. The first end 34 includes an annular counterbore 36. The counterbore 36 tapers inwardly from the first end 34. The taper of the counterbore 36 provides a bearing surface which facilitates the mating engagement of the support 16 and the housing 18, as discussed below. The housing 18 has a wall 40, the inner surface of which includes an annular groove 38. The counterbore 36 tapers to the annular groove 38 which is spaced inwardly from the end 34. The annular groove 38 therefore defines a lower portion 39 of the wall 37. The lower portion 39 is a skirt that extends over the boss 24 when the support 16 and the housing 18 join together, as discussed below. In the illustrated embodiment, the annular groove 38 is square-shaped in cross-sectional view. In an alternate embodiment (not shown) the annular groove 38 is dish-shaped.

The housing 18 includes the side wall 40 which extends upwardly to a nose 42. In the illustrated embodiment, the nose 42 is defined by a parabolic cone. The conical shape of the nose 42 facilitates insertion of the handle 10 into a confectionery product, as discussed below.

The confectionery product 14 is shown in cut-away view enveloping the housing 18 with a lower surface 43 near the lower end 34. The edges and ends 44 of the confectionery product 14 are rounded to facilitate removal from a manufacturing mold. It is preferred that the lower edge 43 of the confectionery product 14 reach near the first end 34 of the housing 18 without extending below the connection between the housing 18 and the support 16. The confectionery product 14 thereby does not fill in the gap between the lower end 34 and the boss 24. In a preferred embodiment, the gap between the lower edge 43 and the first end 34 is about ¼ inch.

The engagement of the flange 28 in the groove 38 defines a joint (not illustrated). The joint provides a seal that prevents communication between the atmosphere and the housing 18.

In use, the handle 10 encloses the novelty item 12, such as a ring as shown in the illustrated embodiment, and receives the confectionery product 14 for consumption. The handle 10 is assembled by first inserting the novelty item 12 into the housing 18. The support 16 is then detachably joined to the housing 18. The upper end 21 of the support 16 is inserted into the first end 34 of the housing 18. The bearing surface 30 of the support 16 pushes against the annular counterbore 36 of the housing 18 to slidingly engage the handle with the housing. The bearing surface 30 and the counterbore 36 cooperate to slightly widen the first end 34 of the housing 18. The annular groove 38 receives the flange 28 of the support 16. The support 16 and the housing 18 are thereby detachably engaged. The annular groove 38 and the flange 28 cooperate to seal the interior compartment of the housing 18 that contains the novelty item 12.

The confectionery product 14 then receives the assembled handle 10. The confectionery product 14 is contained within a mold and partially solidified. For example, a confectionery product 14 which is frozen, such as ice cream, fruit bars, and the like, is poured as a liquid into a mold. The liquid is partially frozen. The handle 10 is pushed, nose 42 first, into the partially solidified confectionery product 14. The nose 42 having a parabolic cone shape facilitates insertion of the handle 10 into the confectionery product. The confectionery product is then solidified to rigidly secure the handle 10 in the product. The confectionery product 14 is then packaged with others for shipment, storage and sale.

The confectionery product 14 is consumed by an eater to uncover the housing 18. The novelty item 12 is released from the housing 18 by breaking the mating engagement between the annular groove 38 and the flange 28. This is accomplished by grasping the housing 18 in one hand and the support 16 in the other hand. The thumbs preferably bear against the housing 18 and the support 16 at the joint defined by the flange 28 in the groove 38. The handle 10 is forced outwardly at the joint to break the engagement between the flange 28 and the groove 38. The lower end 19 of the support 16 and the nose 42 of the housing 18 pivot inwardly. This movement about the joint detaches the flange 28 from the groove 38. The support 16 separates from the housing 18. The novelty item 12 is released from the housing 18 through the open end 34.

The handle 10 of the present invention is made of a food-grade material. The handle preferably is molded with a plastic. The preferred material is high density polyethylene. This plastic provides sufficient rigidity for the side wall 40 of the housing 18. The side wall preferably has a thickness of about 0.050 inch. A low density plastic may necessitate molding ribs in the side wall 40 for rigidity.

A preferred embodiment of the present invention provides a handle 10 having an overall length of 4 and ⅛ inches. The support 16 is 2½ inches. The elongated body 20 has a diameter of ¾ inch and the boss 24 has a second diameter of 5/16 inch. The housing 18 has an overall length of 2 7/16 inches including the height of the parabolic nose 42 of ½ inch. The diameter of the housing 18 is 1 inch. The annular groove 38 is offset from the first end 34 of the housing 16 approximately ⅛ inch.

A variety of novelty items 12 may be encased in the housing 18. For example, the types of novelty items for use with the handle 10 include toys, jewelry, and candy. The candy may be wrapped or not, as the housing provides a sanitary enclosure for the novelty item 12. The housing 12 could further hold a paper coupon or form. Thus, the handle 10 of the present invention may find particular utility for use in enclosing a promotional premium with a confectionery product 14. For example, the coupon could be redeemed for another food product. The coupon could also comprise an entry blank for a contest. The entry blank would be delivered by the eater to the entity conducting the contest. The housing keeps the enclosed coupon or blank from fouling by the confectionery product.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims.

What is claimed is:

1. A combined novelty containing handle assembly and a confectionery product supported on said handle assembly, said handle assembly comprising:

support means dimensioned to be held in a hand of a person consuming said confectionery product, said support means comprising an elongated support member having top and bottom ends wherein said top end comprises a top wall; and elongated housing means for serving the dual functions of housing said novelty and supporting said confectionery product, said housing means having an outer wall rigidly secured to and within said confectionery product, said housing means having an interior compartment containing said novelty, a closed top first end disposed within said confectionery product, and an open bottom second end communicating with said interior compartment, and complimentary means on both the top end of said support member and said open bottom of said second end of said elongated housing selectively fittingly engaging said elongated housing onto said support member to form a connection junction and selectively enclose said novelty in said interior compartment and close said open second end of said housing with said top wall of said support means, said confectionery product surrounding substantially the entirety of said housing means except for said bottom second end, such that said connection junction and said support member are exposed below said confectionery product.

2. The assembly of claim 1 wherein said closed top first end of said housing tapers to facilitate insertion of the housing into said confectionery product.

3. The assembly of claim 1 wherein said complimentary means comprises both a flange extending transversely from said support member and surrounding said top end of said support member and a groove on said bottom second end of said housing defined therein surrounding said opening receiving and selectively engaging said flange.

4. The assembly of claim 3 wherein said flange tapers toward said top end of said support member to define a bearing surface to facilitate entry of said flange into said groove.

5. The assembly of claim 3 wherein said bottom second end of said housing is interiorly counterbored to taper toward said compartment and facilitate entry of said flange into said groove.

6. The method of supporting a confectionery product while containing a novelty item, said method comprising firmly securing said confectionery product to said handle assembly of claim 1 by securing said confectionery product directly to said outer wall of said elongated housing means that is fittingly engaged to said support member.

* * * * *